(12) United States Patent
Mohn

(10) Patent No.: US 11,608,392 B2
(45) Date of Patent: Mar. 21, 2023

(54) POLYMERIZATION PROCESS

(71) Applicant: INEOS USA LLC, League City, TX (US)

(72) Inventor: Robert Norman Mohn, Houston, TX (US)

(73) Assignee: INEOS USA LLC, League City, TX (US)

( * ) Notice: Subject to any disclaimer, the term of this patent is extended or adjusted under 35 U.S.C. 154(b) by 0 days.

(21) Appl. No.: 17/099,973

(22) Filed: Nov. 17, 2020

(65) Prior Publication Data

US 2022/0153882 A1    May 19, 2022

(51) Int. Cl.
  C08F 2/34    (2006.01)
  C08F 2/38    (2006.01)
  B01J 8/26    (2006.01)

(52) U.S. Cl.
  CPC ..................................... *C08F 2/34* (2013.01)

(58) Field of Classification Search
  USPC ............................................ 528/501; 526/65
  See application file for complete search history.

(56) References Cited

U.S. PATENT DOCUMENTS

| | | |
|---|---|---|
| 3,957,448 A | 5/1976 | Shepard |
| 3,965,083 A | 6/1976 | Jezl |
| 3,971,768 A | 7/1976 | Peters |
| 4,703,094 A | 10/1987 | Raufast |
| 4,829,038 A | 5/1989 | Hoppin |
| 4,866,022 A | 9/1989 | Arzoumanidis |
| 4,902,483 A | 2/1990 | Raufast |
| 6,069,212 A | 5/2000 | Hung |
| 2019/0330385 A1* | 10/2019 | Van Miltenburg ........ C08F 2/01 |

FOREIGN PATENT DOCUMENTS

| | | |
|---|---|---|
| EP | 0192427 B1 | 6/1989 |
| EP | 0824117 A1 | 2/1998 |
| WO | 97/25355 A1 | 7/1997 |
| WO | 99/00430 A1 | 1/1999 |
| WO | 2005/003188 A1 | 1/2005 |

* cited by examiner

*Primary Examiner* — Fred M Teskin
(74) *Attorney, Agent, or Firm* — James J. Drake

(57) ABSTRACT

The present invention relates to a process for polymerization of a monomer, and in particular whereby polymer particles are transferred from an upstream polymerization reactor, which process comprises:
(a) discharging a mixture comprising polymer particles and reactive gases, which reactive gases comprise hydrogen, from the upstream reactor,
(b) transferring the polymer particles and reactive gases into a first chamber which is in open communication with a second chamber during the transfer such that the polymer particles pass through the first chamber into the second chamber,
(c) keeping the first and second chamber in open communication for a time period, t, after completing transfer of the polymer particles to the second chamber, and
(d) subsequently isolating the second chamber from the first chamber and transferring the polymer particles from the second chamber into a downstream vessel.

20 Claims, 1 Drawing Sheet

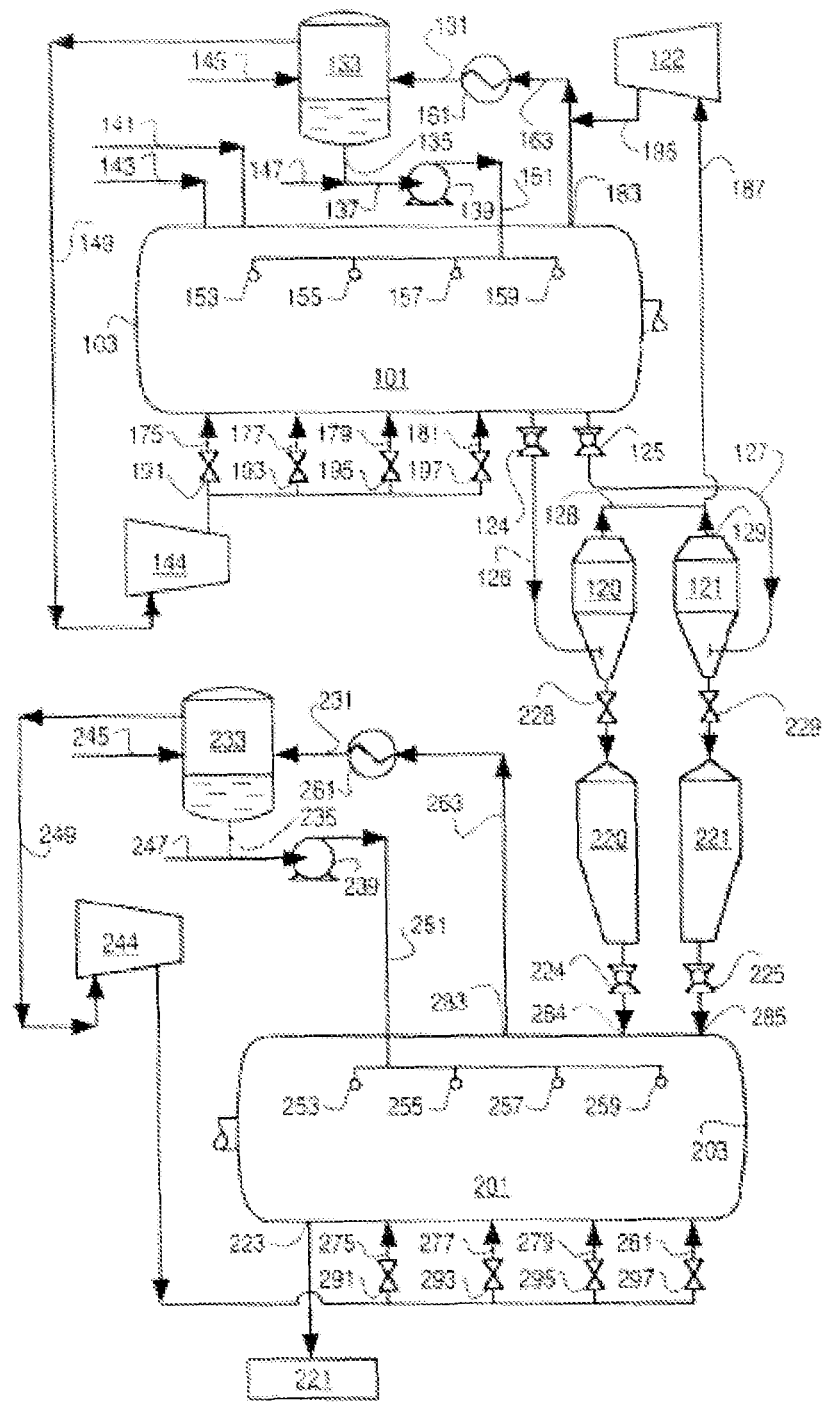

POLYMERIZATION PROCESS

BACKGROUND OF THE INVENTION

1. Technical Field

The present invention relates to a process for polymerization of a monomer. More specifically, this invention provides a process for transfer of polymer particles from an upstream polymerization reactor to a downstream vessel, and especially a downstream polymerization reactor.

Polymers formed from alkenes of 2 to 8 carbon atoms such as propylene or a mixture of propylene and other lower alkenes may have a tendency to agglomerate under operating conditions during polymerization. Methods and apparatus according to this invention are useful for transfer of polymer particles, particularly between subfluidized particulate beds of alpha-olefin polymers in high pressure, reactive gas-filled, continuous, vapor-phase polymerization reactors.

2. Description of the Prior Art

The production of polymer particles, such as polyethylene and polypropylene, by polymerizing the respective monomer, and optionally a comonomer, in the slurry phase or the gas phase is well known. Processes are also known in which two or more reactors are operated in series at different operating conditions to produce multimodal polymers.

Gas-phase polymerization of a polymerizable monomer or mixture thereof to produce normally solid polymer substances using a fluidized particulate bed of polymer is known and is described in a number of patents, including: EP 824117, WO 97/25355 and WO 99/00430. In a fluidized bed polymerization process, monomer and catalyst are passed into a reaction zone wherein they react to form a bed of polymer particles which is maintained in a fluidized state by continuously passing through the bed of polymer a gas, known as a fluidising gas. Fluidising gas which has passed through the bed of polymer particles is withdrawn from the reaction zone and recycled via an external conduit for re-use. Each of EP 824117, WO 97/25355 and WO 99/00430 describe a polymerization process where the recycling fluidising gas is cooled so that a portion of it condenses and forms a liquid, which liquid is then recycled to the reaction zone.

Vapor-phase polymerization of a polymerizable monomer or mixture thereof to produce normally solid polymer substances using a quench-cooled, vapor-phase polymerization reactor containing a subfluidized particulate bed of polymer is also known and has been described in a number of patents including: U.S. Pat. No. 3,957,448 (Shepard et al.), U.S. Pat. No. 3,965,083 (Jezl et al.) and U.S. Pat. No. 3,971,768 (Peters et al.), the disclosures of which are specifically incorporated herein in their entirety by reference. These US patents describe polymerization processes and apparatus in which polymer is formed from gaseous monomer in horizontal stirred-bed vessels. (Other processes are known in which reactors are vertically disposed.)

A horizontally disposed reactor vessel has recycle propylene gas introduced into the bottom thereof together with hydrogen gas. Typically, quench liquid, such as liquid propylene, is injected into the reactor from the top of the reactor. The hydrogen is provided for molecular weight control.

Since a stirred bed is not in a fluidized condition, back-mixing of the particles of polymer in the horizontally disposed reactor vessel is limited. In contrast, solid particles in a fluidized bed are very well mixed. Even at commercially useful ratios of length to diameter, horizontal stirred-bed reactor systems can readily achieve a degree of mixing of solids equivalent to two, three, or more theoretical back-mix reactors.

As is well known in the art, particulate polymers and copolymers may be sticky, i.e., tend to agglomerate, due to their chemical or mechanical properties or pass through a sticky phase during the production cycle. Sticky polymers also are referred to as non-free flowing polymers because of their tendency to compact into aggregates of much large size than the original particles and not flow out of the relatively small openings in the bottom of product discharge tanks or purge bins.

Means for polymer particle transfer between horizontally disposed quench cooled subfluidized bed reactors such as those in the references noted above is described in U.S. Pat. No. 6,069,212. In this document there is provided a transfer chamber at a pressure below that in the upstream reactor in which polymer particles are collected. A purge gas is then applied to the collected polymer particles to purge the reactive gases deriving from the first reactor from the polymer particles, before the transfer chamber is then pressurised to above the pressure in the downstream reactor, and the polymer particles are transferred thereto.

Means for polymer transfer between vertically disposed fluidized bed reactors is described in U.S. Pat. Nos. 4,703,094, 4,902,483 and EP 192427. The particle transfer means described includes three serially connected vessels (a discharge vessel, a decompression vessel and a compression vessel) and a pneumatic lifting system which uses reaction gas from the downstream reactor. The patents teach that times of contact of the polymer with reaction gas from the downstream reactor in the compression vessel and the pneumatic lifting system must be very limited: less than or equal to 60 seconds in the compression stages, and less than or equal to 180 seconds in the pneumatic lifting stage. Because reaction gas from the downstream reactor is used in the compression vessel and the pneumatic conveyance of the polymer, reaction gas from the downstream reactor is transferred into the upstream reactor with gas recycled from the decompression vessel into the upstream reactor.

We have now found a further improved method for polymerization of monomer involving the transfer of polymer particles from an upstream polymerization reactor.

SUMMARY OF THE INVENTION

One aspect of the present invention is a process for polymerization of a monomer whereby polymer particles are transferred from an upstream polymerization reactor, which process comprises:

(a) discharging a mixture comprising polymer particles and reactive gases, which reactive gases comprise hydrogen, from the upstream reactor, (b) transferring the polymer particles and reactive gases into a first chamber which is in open communication with a second chamber during the transfer such that the polymer particles pass through the first chamber into the second chamber, and wherein
  i) the second chamber is at a pressure which is at least 600 kPa below the operating pressure of the upstream reactor,
  ii) the second chamber has a volume less than or equal to the volume of the first chamber, and
  iii) transfer of polymer particles takes place until there is collected in the second chamber a volume of polymer particles having a settled volume of at least 50% of the volume of the second chamber, (c) keeping the first and second chamber in open communication for a time period, t, after completing transfer of the polymer particles to the second chamber, and (d) subsequently isolating the second chamber from the first chamber and transferring the polymer particles from the second chamber into a downstream vessel.

The present invention enables hydrogen in the reactive gases exiting the upstream reactor to be separated from the polymer particles prior to their transfer to the downstream vessel.

The present invention may be particularly applied where the downstream vessel is a downstream polymerization reactor, in which case the present invention provides a method for polymerization of monomer involving the transfer of growing polymer particles between upstream and downstream polymerization reactors while enabling each to be maintained at independently selected operating conditions.

The upstream polymerization reactor is preferably a gas phase polymerization reactor. In one embodiment the upstream reactor is a quench-cooled, polymerization reactor containing a sub-fluidized particulate bed of polymer. In another embodiment the upstream reactor is a gas phase fluidized bed polymerization reactor.

More preferably both the upstream and downstream reactors are gas phase polymerization reactors. The upstream and downstream reactors are each preferably selected from a quench-cooled, polymerization reactor containing a sub-fluidized particulate bed of polymer and a gas phase fluidized bed reactor. For example, both may be quench-cooled, polymerization reactors containing a sub-fluidized particulate bed of polymer or both may be gas phase fluidized bed polymerization reactors. It is also possible, for example, for the upstream reactor to be a quench-cooled, polymerization reactor containing a sub-fluidized particulate bed of polymer and the downstream reactor to be a gas phase fluidized bed reactor.

BRIEF DESCRIPTION OF THE DRAWINGS

FIG. 1 is a flowchart showing one embodiment of the vapor-phase polymerization process of the invention having two serially disposed polymerization reactors each containing a mechanically-stirred, subfluidized particulate polymer bed wherein at least a portion of the heat of polymerization is removed by evaporative cooling using a readily volatilizable quench liquid, with essentially total reactor off-gas recycle, and apparatus for isolated interreactor transfer of polymer particles from upstream to downstream, high pressure, reactive gas-filled, continuous, vapor-phase polymerization reactors while maintaining each at independently selected operating conditions useful in explaining the invention.

DESCRIPTION OF THE PREFERRED EMBODIMENT(S)

A key feature of the present invention is that polymer particles and reactive gases are collected in the second chamber which has a pressure therein at least 600 kPa below the operating pressure of the upstream reactor, and then the first and second chambers are maintained in open communication for a time period, t, after completing transfer of the polymer particles to the second chamber.

The reduction in pressure compared to the upstream reactor causes absorbed monomer to degas from the polymer particles in the second chamber and displace the reactive gases, including the hydrogen therein, from the second chamber and into the first chamber.

Preferably the second chamber is at a pressure which is at least 700 kPa below the operating pressure of the upstream reactor, such as 700-1400 KPa below the operating pressure of the reactor. It will be apparent that the pressure in the second chamber increases as polymer particles and reactive gases are transferred to the second chamber from the upstream reactor. As used herein, reference to the second chamber being a defined minimum pressure below the operating pressure of the upstream reactor refers to the pressure in the second chamber at the completion of the transfer in step (b).

It is a feature of the present invention that the second chamber has a volume less than or equal to the volume of the first chamber and that the transfer of polymer particles takes place until there is collected in the second chamber a volume of polymer particles having a settled volume of at least 50% of the volume of the second chamber.

In relation to the relative volumes of the first chamber and second chamber, reducing the volume of the second chamber compared to the first chamber is advantageous. In particular, the reactive gas which enters the first chamber and second chamber during steps (a) and (b) increases the pressure in the two chambers. The total amount of pressurised reactive gas added depends on the total amount of polymer particles discharged from the upstream reactor. The total volume of the second chamber is defined by the volume of polymer particles it is desired to transfer in each sequence (and the desired "fill" of the second chamber). The total increase in pressure due to the discharged reactive gas can be reduced by increasing the size of the first chamber relative to the second chamber. Preferably, the second chamber has an internal volume less than, such as less than 50% of, more preferably less than 20% of, and most preferably between 5 and 20% of, the volume of the first chamber, such as between 8 and 15% of the volume of the first chamber.

In relation to the "fill" of the second chamber, an increase in the amount of polymer particles collected in the second chamber serves firstly to reduce the (residual) volume of the second chamber which can be filled with the reactive gases discharged from the upstream reactor with the polymer particles, whilst at the same time an increased volume of polymer particles provides an increased volume of absorbed monomer which can desorb and displace said reactive gases from the second chamber.

Preferably the transfer of polymer particles takes place until there is collected in the second chamber a volume of polymer particles having a settled volume of at least 60% of the volume of the second chamber and most preferably at least 70%, such as at least 75%, of the volume of the second chamber.

There is preferably collected in the second chamber a volume of polymer particles having a settled volume of less than 100% of the volume of the second chamber i.e. the second chamber is not completely filled. More preferably there is collected in the second chamber a volume of polymer particles having a settled volume of less than 90% of the volume of the second chamber.

The settled volume of the polymer solids, as used herein, is that calculated by using the apparent density of a typical sample of polymer solids determined according to ASTM D1895, Method A (equivalent to ISO Method R 60).

In one embodiment, the mixture comprising polymer particles and reactive gases may be discharged discontinuously from the upstream reactor in step (a). Each discharge provides a slug of polymer particles and reactive gases that are then transferred to the first chamber and then into the second chamber in step (b).

In this embodiment steps (a) and (b) may be repeated to collect the desired amount of polymer particles in the second chamber prior to step (c).

Alternatively, the mixture comprising polymer particles and reactive gases may be discharged continuously from the upstream reactor in step (a), and then continuously transferred to the first chamber and then into the second chamber in step (b). In this case the transfer is continued until there has been collected the desired amount of polymer particles in the second chamber.

It is preferred to provide two or more parallel sets of first chamber and second chamber to transfer polymer particles and reactive gases according to step (b). This allows polymer particles and reactive gases to be transferred into one or more sets of first chamber and second chamber according to step (b) whilst one or more other sets are performing the subsequent steps (c) and (d) on previously transferred polymer particles.

In particular, the discharged mixture of polymer particles and reactive gases can be transferred according to step (b) in at least one set of first chamber and second chamber until the desired volume of polymer particles are collected, and then discharge can be switched so that transfer according to step (b) takes place in at least one other set of first chamber and second chamber when the desired volume of polymer particles has been collected in the second chamber(s) of the initial set(s).

The use of two or more parallel sets of first chamber and second chamber to transfer polymer particles and reactive gases according to step (b) allows continuous discharge from the upstream reactor to be maintained.

However, it is also preferable to have two or more parallel sets of first chamber and second chamber to transfer polymer particles and reactive gases according to step (b) even when the discharge in step (a) is discontinuous.

The number of sets of first chamber and second chamber can be selected according to the required overall transfer rate of polymer particles from the upstream reactor and based on the volumes of polymer particles collected in each sequence in each of the second chambers, as well as the cycle time for the sequence (i.e. the time from when the first chamber and second chamber in one set start to receive polymer particles and reactive gases in one batch until they can be ready to receive a subsequent batch of polymer particles and reactive gases).

A gas purge may be provided on the transfer line between the point of discharge from the upstream reactor and the first chamber. The gas may be used to ensure complete transfer of discharged polymer particles and reactive gases to the first chamber.

In step (c) according to the present invention the first and second chambers are kept in open communication for a time period, t, after completing transfer of the polymer particles to the second chamber.

The completion of transfer of polymer particles to the second chamber refers to the point at which there has been collected the desired amount of polymer particles in the second chamber and further transfer according to step (b) (in a particular sequence) has been stopped. It will be apparent that where transfer according to steps (a) and (b) is repeated two or more times to collect the desired amount of polymer particles in the second chamber prior to step (c), then completion of transfer occurs at the end of the last transfer and the time, t, starts from this point.

The time period, t, after completing the transfer is provided to allow absorbed monomer to desorb from the polymer particles in the second chamber and to displace the reactive gases which have been transferred into the second chamber with the polymer particles.

The time period, t, should therefore be sufficient for the polymer particles to degas a volume of absorbed monomer equivalent to at least the interstitial volume of the polymer particles in the second chamber.

In some embodiments it is preferred that the polymer particles degas a volume of absorbed monomer equivalent to at least the volume of reactive gases in the second chamber, the volume of reactive gases equates to any volume above the level of the polymer particles plus the interstitial volume between the polymer particles.

Generally, the time period, t, is at least 1 second, such as at least 10 seconds, and preferably at least 30 seconds. A time period of 30-90 seconds is preferred.

For avoidance of doubt, monomer gas will be present in the reactive gases discharged from the upstream reactor, as well as there being monomer absorbed on the polymer particles. The species which degas from the polymer may, in addition to monomer, include other components present in the upstream reactor which have absorbed on the polymer, and in this case such components will also generally be present in the reactive gases discharged. However, since hydrogen does not absorb, at least not to any significant extent, under the conditions present in the upstream reactor the species which degas from the polymer do not comprise hydrogen. The degassed species therefore displace the reactive gases initially present, including the hydrogen, from the second chamber. It will be apparent that monomer and other gases initially present with the hydrogen in the reactive gases may be displaced by both monomer and other species initially absorbed. For ease of description, and because the displacement of hydrogen is central to the present invention, the present invention is nevertheless described principally by reference to displacement of the hydrogen by the degassed monomer.

A particular advantage of the present invention is that hydrogen is displaced from the second chamber without requiring the addition of supplemental purge gas. The absence of a purge gas during step (c) is particularly preferred. Nevertheless, although less preferred, in some embodiments it may be that a purge is still applied. In such scenarios the volume of purge applied is generally relatively small compared to that expected to purge hydrogen in the absence of the displacement by absorbed monomer in the present invention. For example, the volume of purge gas used is preferably less than 25% of the volume of the second chamber.

Due to the use of degassed monomer to displace hydrogen it is also the case that any purge need not be applied directly to the very bottom of the second chamber. Applying a purge to the very bottom requires a nozzle which can cause issues with flow of polymer out of the second chamber or interferes with the measurement of the powder level. The present invention effectively removes hydrogen from the bottom of the second chamber using the monomer degassed from polymer located at the bottom, so any purge nozzle can be added further up the vessel.

In step (d) the second chamber is isolated from the first chamber and polymer is transferred to the downstream vessel.

The transfer in step (d) may be due to or assisted by gravity. Preferably the transfer takes place by pressurising the second chamber to a pressure at least 7 kPa above the pressure of the downstream vessel. The increased pressure serves both to assist the powder discharge and to prevent any backflow of reactive gases from the downstream vessel. Typically the transfer takes place by pressurising the second chamber to a pressure at least 14 kPa above the pressure in the downstream vessel, such as at least 35 kPa above the pressure in the downstream vessel.

In a further aspect of the present invention, the second chamber is not completely emptied of polymer in step (d). In particular, transfer is facilitated in the present invention by using a pressure of gas in the second chamber above the polymer particles to effectively "push" the polymer particles into the downstream vessel. Maintaining a residual volume (or "heel") of polymer particles in the second chamber acts to ensure pressurising gas does not break through and also transfer to the downstream vessel but is instead maintained in the second chamber at the end of the sequence.

After step (d) the second chamber may be reduced in pressure ready for the next sequence. In a preferred embodiment a pressurising gas is used which is compatible with the process in the upstream reactor, and the pressure reduction can then be performed by routing the pressurising gas from the second chamber to the upstream reactor, and in particular via the first chamber by putting the first and second chambers in open communication again.

It will be noted that the transfer of the polymer particles and reactive gases from the upstream reactor to the second chamber and, subsequently, from the second chamber to the downstream vessel can both utilise the respective pressure differentials between vessels to facilitate or aid the transfer. A particular advantage of this is that it can provide improved flexibility in the relative locations of the upstream reactor, first and second chambers and the downstream vessel in the polymerisation plant. For example, if relying on gravity for transfer, which is the case in some process designs, then it becomes necessary for the upstream reactor to be located physically higher than the first and second chambers, and these to be physically higher than the downstream vessel. Locating the upstream reactor a significant distance off of the ground is, however, costly and challenging for construction. The present invention allows the upstream reactor, the chambers and the downstream vessel to all be located at or close to ground level if desired. Any "uplift" required to transfer from an exit of one vessel to a relatively higher point on the subsequent one can be accommodated using the pressure differential between the vessels. This can provide a significant further advantage from the process of the present invention.

The steps (a) to (d) in the present invention comprise a sequence or cycle which, after step (d), can be repeated by transfer of further polymer particles and reactive gases to the second chamber. The duration of each sequence can depend upon particular monomers, conditions of operation, rate of polymerization, size of apparatus, etc. Cycle times are, generally, in a range upward from about 1 minute to about 30 minutes, such as about 1 minute to about 10 minutes. Preferred cycle times are in a range of from about 2 to about 8 minutes. (A typical time for the filling of the second chamber with the desired volume of polymer particles is 30-90 seconds. A typical time for step (d) is 90 to 420 seconds, which includes, in the preferred operation, pressurising the second chamber, discharging the polymer particles and then depressurising the second chamber/opening the second chamber to the first chamber to prepare for the next cycle.)

The process of the present invention can be applied to the polymerization of polymerizable monomers which are polymerizable below the softening point of their polymer forms including ethylene, propylene, 4-methyl-pentene-1, butene-1 and mixtures of such monomers.

The process according to the invention may applied where at least one, and preferably both, of the upstream reactor and downstream vessel are gas phase fluidized bed polymerization reactors. In such embodiments the monomer is preferably ethylene, which may optionally be polymerized with one or more comonomers, typically an olefin having 3 to 10 carbon atoms.

Processes according to the present invention are however, advantageously, used for continuous polymerization of propylene with or without comonomers.

Propylene may be polymerized in the substantial absence of other monomers to produce propylene homopolymer or in the presence of other monomers (hereinafter referred to as "comonomers") to produce propylene copolymers. In particular, propylene may be homopolymerized in each of the upstream and downstream reactors, may be copolymerized in each of the upstream and downstream reactors, or may be homopolymerized in one reactor and copolymerized in the other, depending on the product it is desired to produce. Where propylene is copolymerized in each of the upstream and downstream reactors different comonomers or different ratios of comonomers may be used in each reactor. Further, when performing copolymerization reactions more than one comonomer may be present with propylene.

In the process of the present invention the gas phase in the upstream reactor comprises hydrogen. Hydrogen is generally added to control molecular weight and may be added at a different ratio in each reactor.

The present invention is particularly useful when applied to processes in which hydrogen is present in the upstream reactor at a higher concentration than in the downstream reactor.

In one embodiment, the gas phase in the upstream reactor should comprise less than 10 mol % ethylene, preferably less than 5 mol % ethylene, such as less than 1 mol % ethylene. Most commonly, the gas phase in the upstream reactor is substantially free of ethylene. In particular, the monomer to be polymerized preferably consists of propylene or propylene and a comonomer other than ethylene.

(By "substantially free" as used in the present invention, both in relation to ethylene noted above, but also where used for other species, is meant that such component is not specifically added to the process/reactor. Taking ethylene as an example, industrial grade propylene may comprise small quantities of ethylene impurity, which inevitably end up in the process, It is also possible for small quantities of comonomers to be formed in-situ on certain polymerization catalysts—for example propylene may dimerize to form hexene. For the purposes of the present invention the process is considered substantially free of such components because they are not specifically added.)

Many desired polypropylene products are produced with ethylene as a comonomer. In the present invention, such polymer products are preferably produced by continuous polymerization where ethylene is provided in the downstream reactor at a higher concentration than in the upstream reactor.

Preferably, the process of the present invention further comprises recycling at least a portion of the reactive gases (including hydrogen) and degassed monomer from the first chamber to the upstream reactor. Preferably the first chamber comprises a gas outlet located near its top by which the gas can be recycled from the first chamber to the upstream reactor, such as via a gas compressor.

The recycle may advantageously be performed whilst the first chamber and the second chamber are isolated from each, and in particular simultaneously with step (d). The size of the second chamber in the present invention is selected based on the volume of polymer it is desired to transfer from the upstream reactor in each sequence, and so to obtain the desired minimum "fill" of polymer particles. As noted already, this minimises the volume occupied by gas in the second chamber once the polymer particles and reactive gases have been added.

In a preferred embodiment where the process operating in the upstream reactor is a propylene polymerization the pressurising gas is preferably essentially pure propylene. However, since this gas is preferably recycled to the upstream reactor it may in some embodiments also comprise any components which are also found in the upstream reactor.

A further advantage of the present invention is that the relatively low pressure in the second chamber at the start of a sequence has the effect of expanding the volume of the reactive gases sent with the polymer particles from the upstream reactor into the second chamber. Only a fraction of this gas fits in the relatively small "free" volume of the second chamber and the remainder is retained in the first chamber. At the reduced pressure, monomer begins to degas from the polymer particles, sweeping the spaces between the polymer particles, pushing even more of the reactive gases into the first chamber. When the two chambers are isolated, the pressure in the second chamber can be increased by adding fresh monomer. Now, when polymer particles are transferred to the downstream vessel, much of the reactive gas transferred with the particles from the upstream reactor has been replaced with degassed monomer or the pressurizing gas of fresh monomer. In particular, the amount of hydrogen transferred with the polymer particles is significantly reduced.

For example, in a system where both the upstream and downstream reactors are propylene polymerization reactors and with a first chamber of volume 27.7 m$^3$ and a second chamber of 3.3 m$^3$ at a starting pressure of 790 kPa, 773.1 kg of polymer particles can be transferred from an upstream reactor through the first chamber and into the second chamber. With these polymer particles, about 143 kg of reactive gases are also taken out of the upstream reactor. After a 17 kg sweep of polymer grade propylene clears the transfer line from the upstream reactor to the first chamber, the two chambers are maintained in open communication at a pressure of approximately 1170 kPa. After the two chambers are isolated from each other, 84.5 kg of polymer grade propylene is added to the second chamber, raising its pressure to about 2500 kPa. At this point, the second chamber is opened to the downstream reactor and the 773.1 kg of polymer particles are transferred to the reactor. Note that in the settled state of the second chamber, the polymer particles have a much higher bulk density than when withdrawn from the upstream reactor, and only 57.0 kg of monomer and reactive gases are transferred with the polymer particles into the downstream reactor. Of particular interest is the amount of hydrogen transferred from the upstream to downstream reactor with those particles. In this embodiment, the hydrogen concentration in the reactive gases of the upstream reactor is about 2.23 mol %, meaning that in the 143 kg of reactive gas discharged from the upstream reactor, there is a total of about 155 g of hydrogen. However, between the expansion of the gas, the settling of the polymer particles, and the displacement by the degassed monomer, only about 14 g of hydrogen enter the downstream reactor. This allows the upstream and downstream reactors to be independently operated at different hydrogen concentrations.

In a most preferred embodiment both the upstream and downstream reactors are quench-cooled, polymerization reactors containing a sub-fluidized particulate bed of polymer. Such reactors, and the operation therein, are generally as known in the art. The reactors may be vertically or horizontally disposed. (As used herein "vertically disposed" means that the reactors have a vertically orientated axis of rotation, whilst "horizontally disposed" means that the reactors have a horizontally orientated axis of rotation.) The reactors are preferably as described in U.S. Pat. No. 6,069,212 and the references noted therein. For example, the subfluidized particulate beds of polymer in each reactor are preferably mechanically stirred and have a free surface within each reactor.

The discharge from the upstream reactor in such a system is preferably performed discontinuously and the slugs of polymer particles and reactive gases obtained are transferred through the first chamber and into the second chamber. In a typical sequence, three to eight slugs, such as four or five slugs, comprising polymer particles and reactive gases may be discharged to the second chamber. (Typically a slug comprising a mixture of polymer particles and reactive gases are discharged from the upstream reactor by opening a valve on the upstream reactor for 2-10 seconds, preferably 4-8 seconds, then closing the valve for a similar time period, and then these steps are repeated to give further slugs.)

Transfer of polymer particles is advantageously carried out by discharging each slug comprising polymer particles and reactive gases from the upstream reactor through an outlet port located in the reactor wall at an elevation below the free surface of the subfluidized bed of polymer therein.

A typical upstream reactor may be operated at a pressure of above 2000 kPag, such as 2200-2800 kPag. Preferably the pressure in the second chamber is above 600 kPag at the beginning of the cycle, such as in the range 700-900 kPag. The pressure should preferably remain under 1500 kPag after all slugs comprising polymer particles in a particular sequence have been discharged thereto.

After transfer of the polymer particles the degassing of the absorbed monomer occurs due to the reduction in pressure. In this embodiment, after transfer of the last slug in a sequence the polymer particles in the second chamber are typically allowed to degas for a time period, t, of at least 10 seconds, such as 30 to 90 seconds. This allows the absorbed monomer to degas sufficiently to sweep the second chamber sufficiently clear of hydrogen so that the gas composition in the downstream reactor is not adversely affected when the polymer particles are transferred into that reactor.

Cycle times for transferring polymer particles between continuous, vapor-phase polymerization reactors in accordance with this embodiment of the present invention are, generally, in a range upward from about 1 minute to about 30 minutes, such as about 1 minute to about 10 minutes. Preferred cycle times are in a range of from about 2 to about 8 minutes. Most preferred cycle times are in a range of from about 3 to about 6 minutes, such as 3.5 to 5 minutes.

In this embodiment, the polymer particles may be transferred from the second chamber into the downstream reactor via one or more transfer lines which connect the second chamber to one or more inlet ports on the downstream reactor, which one or more inlet ports are located in the reactor wall at an elevation above the free surface of the subfluidized bed of polymer therein. Preferably the one or more inlet ports are located in the reactor wall at an elevation above the free surface and on the side on which the stirrer blades rotate downwards. In preferred embodiments the second chamber is located vertically or close to vertically above the inlet port (or ports) and as close as possible to the inlet port (or ports). This minimises the length of the transfer line (or lines). The vertical orientation also allows the transfer line (or lines) to be vertical or predominantly vertical. This allows the transfer to be gravity assisted and reduces the risk of blockage of the line.

The transfer of polymer particles between the high pressure, reactive gas-filled, continuous, vapor-phase polymerization reactors is preferably carried out using two parallel sets of first and second chambers operated in alternating sequences and/or in overlapping sequences. The polymer particles may be transferred from each second chamber into the downstream reactor via a one or more transfer lines which connect each second chamber to one or more inlet ports on the downstream reactor as described above.

The inlet ports from the respective second chambers in this embodiment may be located at a similar longitudinal location on the second reactor. In particular, this is preferred so that the polymer entering the second reactor via either second chamber has a similar residence time in the second reactor.

In one embodiment the inlet ports may be located at the same longitudinal length along the second reactor. It is most preferred, however, that the inlet ports to the downstream reactor from the second chambers are orientated longitudinally down the length of the reactor with respect to each other. For example, this allows more easily that the inlet ports from both second chambers can be located in the reactor wall at an elevation above the free surface and on the side on which the stirrer blades rotate downwards, which is also preferred. It is preferred that the distance between the inlet ports is minimised in this case so that the polymer particles transferred via each port enter at a similar location on the horizontal length of the reactor, giving a more uniform residence time. The inlet ports are preferably located within 3 m of each other.

Most preferably, the second chambers may be fabricated with an eccentric cone bottom and mounted back-to-back. This allows the exits of the respective second chambers to be located close together, and facilitates the installation of the respective inlet ports to the second reactor at a minimum distance apart from each other whilst also minimizing the length of the transfer lines to the downstream reactor. (In particular it aids in minimising the length of the transfer lines from the chambers to the inlet ports/second reactor, and allows the inlet ports to be close together whilst keeping the transfer lines vertical or predominantly vertical as already described.) The second chambers may be as described generally for the "transfer chambers" in U.S. Pat. No. 6,069,212. Preferably, the second chambers in the present invention comprise a vertical side wall on one side (which enables them to be placed back-to-back) and an inclined opposite side. More preferably the inclined opposite side is such that the cone angle measured to the vertical side is equal to or greater than 10°, preferably equal to or greater than 15°. In one preferred embodiment the cone angle measured to the vertical side is less than about 20°, such as from 15° and up to 20°. In another preferred embodiment the cone angle measured to the vertical side is greater than 20°, such as from greater than 20° and up to 30°, more preferably at least 22°, and most preferably from 22 to 25°. Most preferably the inclined opposite side is such that the cone angle measured to the vertical side is between 15 and 22.5°.

Processes according to the present invention are, preferably, carried out using two serially disposed vapor phase polymerization reactors in which subfluidized particulate beds of polymer are contained in a cylindrical portion of each polymerization reactor. The reactors may have a vertically or horizontally disposed ("orientated") axis of rotation. Most preferably the reactors have a horizontally disposed axis of rotation. The reactors are, typically, the same size and have the same nominal dimensions, such as, length and diameter, although the reactors may also be of different size. Where the axes of rotation are horizontal, the axis of rotation of the upstream reactor can be disposed at an elevation the same as, lower or higher than the axis of rotation of the downstream reactor.

The polymerization process according to the present invention using two horizontal reactors for manufacturing a homopolymer, for example, of propylene, random copolymer, for example, of propylene and ethylene, and/or an impact co-polymer, for example, of propylene and ethylene, is shown schematically in FIG. 1.

FIG. 1 shows one embodiment of a vapor-phase polymerization system of this invention using two parallel sets of first and second chambers for interreactor transfer of polymer particles from upstream to downstream, high pressure, reactive gas-filled, continuous, vapor-phase polymerization reactors. Two serially disposed polymerization reactors each containing a mechanically-stirred, subfluidized particulate polymer bed wherein at least a portion of the heat of polymerization is removed by evaporative cooling using a readily volatilizable quench liquid, with essentially total reactor off-gas recycle, and apparatus for isolated interreactor transfer of polymer particles from upstream to downstream, high pressure, reactive gas-filled, continuous, vapor-phase polymerization reactors while maintaining each at independently selected operating conditions.

In FIG. 1, upstream and downstream vessels, where polymerization occurs, are horizontal cylindrical reactors 101 and 201, respectively, that contain, for example, polypropylene particles. Reaction volume of each horizontal polymerization reactor operates as a series of several stirringly agitated sections to provide for the possibility of operating the different sections of the reactor at different temperatures and/or different polymer production rates. Polymerization takes place in all reaction sections to form a particulate polymer bed distributed throughout the reactors. Polymer level in both reactor 101 and reactor 201 is, generally, maintained at approximately 40 to 80 percent of the total reactor volume.

Reactor 101 operates, typically, under an internal pressure of about 2000 to 2800 kPa and at a temperature in a range of about 50 to about 90° C. during production of polypropylene. Polymerization temperatures in each of the sections can be individually controlled by a combination of techniques including the stirring agitation, the controlled differential introduction of vapor recycle into each of the sections through inlets 175, 177, 179, and 181 spaced along the bottom of the reactor by means of valves 191, 193, 195, and 197, respectively, and the introduction into each of the sections of inert quench liquid at different rates through quench liquid inlets 153, 155, 157, and 159. Catalyst, cocatalyst and/or modifier systems are introduced into reactor 101, near front end 103 thereof, through inlet conduits 141 and 143 spaced along the top of the reactor.

Reactor off-gases are removed through outlet 183. Certain deleterious amounts of polymer fines are, typically produced in vapor-phase polymerization reactors. Advantageously, polymer fines are substantially removed prior to cooling of reactor off-gases in off-gas cooler/condenser 161, by using traps, filters, settlers, cyclones, or scrubbers or a combination thereof. Effluent from off-gas cooler/condenser 161 is transferred via conduit 131 into gas-liquid separator 133. Monomers are supplied from storage (not shown) via conduit 147 and combined with condensed liquid via conduit 135 from separator 133 to suction of pump 139 via conduit 137. Pump 139 delivers quench liquid to quench liquid inlets 153, 155, 157, and 159 via conduit 151.

Hydrogen, to obtain a desired molecular weight of polymer produced, may be introduced into separator 133 from storage (not shown) via conduit 145. Recycle gases from separator 133 flow to compressor 144 via conduit 149.

Polymer solid is produced in each of the stirringly agitated reaction sections. Due to continued production of such polymer, an amount of polymer product constantly passes to the take-off end disposed opposite the front end 103 of the reactor 101.

Two parallel sets of first and second chambers for inter-reactor transfer of polymer particles from upstream to downstream, high pressure, reactive gas-filled, continuous, vapor-phase polymerization reactors are depicted in FIG. 1. Particulate polymer is transferred from reactor 101 and into reactor 201 during alternating cycles, typically on time control.

A sequence begins, for example, by brief openings of outlet valve 124 (or 125) to discharge one or more slugs comprising polymer particles and reactive gases, which reactive gases comprise hydrogen from the upstream reactor through an outlet port located in the reactor wall at an elevation below the free surface of the subfluidized bed of polymer therein, to detach a suitable mass of polymer particles from the bed in the upstream reactor. The (instantaneous) withdrawal rate is, generally, at least twice the average rate of polymer production during the period of discharge.

Each slug is transferred through conduit 126 (or 127) into first chamber 120 (or 121) which is maintained at a pressure at least 600 kPa less than the pressure in the upstream reactor 101. First chambers 120 and 121 are, advantageously, disposed at elevation higher than the top of reactor 201 and directly above second chambers 220 and 221, respectively. As discharged polymer particles are separated from reactive gases, the polymer particles fall through open valve 228 (or 229) and are collected in second chamber 220 (or 221). Side walls of the second chamber are preferably vertical and/or inclined toward a bottom discharge port at an angle of greater than 20° from vertical.

The reduction in pressure causes absorbed monomer to degas from the polymer particles in the second chamber 220 (or 221) and displace hydrogen in the reactive gases in the second chamber from the second chamber to the first chamber. This gas, combined with reactive gases from the first chamber, is recycled to the upstream reactor via gas conduit 128 (or 129) and conduit 187 to suction of gas compressor 122. Effluent from gas compressor 122 flows via conduit 185 and conduit 163 into cooler/condenser 161.

After the period of degassing, the second chamber 220 (or 221) is isolated from the first chamber 120 (or 121) by closing valve 228 (or 229). A pressurising gas is used to pressurize the second chamber gas pressure to at least about 7 kPa above the operating pressure of the downstream reactor. This facilitates transfer of the polymer particles from the second chamber into the downstream reactor whilst preventing backflow of gas from the downstream reactor into the second chamber as the polymer particles are discharged. The pressurising gas may be used to pressurize the second chamber gas pressure to at least about 14 kPa, and more preferably at least 35 kPa, above the operating pressure of the downstream reactor.

Finally, valve 224 (or 225) is opened, transferring the polymer particles from the second chamber into the downstream reactor through an inlet port 284 (or 285) located in the reactor wall at an elevation above the free surface of the subfluidized bed of polymer in the downstream reactor.

Reactor 201 operates, typically, under an internal pressure of about 1400 kPag to about 2800 kPag and at a temperature in a range of about 50 to about 90° C. during production of polypropylene. As in reactor 101, polymerization temperatures in each of the sections can be individually controlled by a combination of techniques including the stirring agitation, the controlled differential introduction of vapor recycle into each of the sections through inlets 275, 277, 279, and 281 spaced along the bottom of downstream reactor 201 by means of valves 291, 293, 295, and 297, respectively, and the introduction into each of the sections of inert quench liquid at different rates through quench liquid inlets 253, 255, 257, and 259. Because highly active catalyst, cocatalyst and/or modifier systems have been introduced into reactor 101 and at least a portion of which are transferred into reactor 201 with the polymer particles, introduction of additional catalyst is, generally, not required. However, it is also possible to add one or more of catalyst, cocatalyst and/or modifier also to the second reactor, and sometimes this can be advantageous.

Off-gases are removed downstream reactor 201 through outlet 283 and conduit 263. Polymer fines are, typically, substantially removed prior to cooling of reactor off-gases in off-gas cooler/condenser 261, by again using traps, filters, settlers, cyclones, or scrubbers or a combination thereof. Effluent from off-gas cooler/condenser 261 is transferred via conduit 231 into gas-liquid separator 233. Liquid monomers are supplied from storage (not shown) via conduit 247 and combined with condensed liquid via conduit 235 from separator 233 to suction of pump 239. Pump 239 delivers quench liquid to quench liquid inlets 253, 255, 257, and 259 via conduit 251.

Monomer and/or other gases, may be introduced into separator 233 from storage (not shown) via conduit 245. Recycle gases from separator 233 flow to compressor 244 via conduit 249.

Due to continued production of solid polymer, an amount of polymer product constantly passes to the take-off end disposed opposite the front end 203 of the reactor 201. Discharge apparatus 221 is connected to a discharge port 223 at the take-off end of reactor 201. Particulate polymer product is discharged from the reactor, typically on time control, to a gas expansion bag filter (not shown).

As employed herein, unless otherwise indicated, the term "polymerization" is intended to include both homopolymerization and copolymerization, and the term "polymer" is intended to include both homopolymer and copolymer.

More generally, the polymerization reaction(s) of the present invention can be carried out at temperatures and pressures suitable for the polymerization process. Generally, temperatures range from about 0° C. to about 120° C., with a range of from about 40° C. to about 95° C. being preferred from the standpoint of attaining good catalyst performance and high production rates.

The catalyst to be used is not especially limited and can, for example, be selected from any of the know catalyst types, including chromium catalysts, Ziegler-Natta catalysts and metallocene catalysts.

The following paragraphs describe preferred catalysts for use in quench-cooled, polymerization reactors containing a sub-fluidized particulate bed of polymer. Similar or alternative catalysts may be used for other processes as suitable.

The amount of the catalyst or catalyst component to be employed varies depending on choice of reactor size, monomer to be polymerized, the specific catalyst used, and other factors known to persons of skill in the art. Typically, a catalyst or catalyst component is used in amounts ranging from about 0.15 to about 0.015 milligrams of catalyst to gram of polymer produced.

Use of solid, transition metal-based, high activity, olefin polymerization catalyst components is well known in the art including such solid components supported on a metal oxide, halide or other salt such as widely-described magnesium-containing, titanium halide-based catalyst components. Numerous supported, magnesium-containing, titanium-containing, electron donor containing olefin polymerization or copolymerization catalysts have been disclosed. For example, Arzoumanidis et al., U.S. Pat. No. 4,866,022, incorporated by reference herein, discloses a method for forming an advantageous alpha-olefin polymerization or copolymerization catalyst or catalyst component useful in this invention. In addition to the solid, magnesium containing, titanium containing catalyst component, the polymerization catalyst system used to produce propylene polymers uses an aluminium alkyl component, such as triethylaluminium, and typically an external modifier component such as a silane compound as described in U.S. Pat. No. 4,829,038, incorporated by reference herein.

In general, catalysts which are most useful are those which are very active and give a high yield based on catalyst. Included in this group are cocatalysts composed of organometallic compounds of Periodic Groups IA, IIA, and IIIA and catalysts which are based on transition metal compounds. Aluminium alkyl compound cocatalysts are especially preferred and can be a trialkylaluminium or an alkyl aluminium halide such as a dialkylaluminium chloride. Transition metal catalyst can be a metal compound of Group IV or Group V such as a titanium or vanadium compound, a compound of Group VI such as chromium or molybdenum oxide, or can be one of the above catalysts supported on a magnesium-based support or a support such as alumina, silica, or silica-alumina.

Preferred catalysts and cocatalysts are high yield catalysts. "High yield" means that the residues of catalysts and cocatalysts do not have to be removed from the polymer products in a separate "de-ashing" process. Yields of such catalyst typically exceed 5000 grams of polymer per gram of catalyst and preferably exceed 15,000 grams of polymer per gram of catalyst.

While a wide variety of organometallic systems or solid catalysts can be employed for the polymerization of olefins, particularly propylene, to solid polymers, it is often preferred to use a catalyst which includes a combination of an aluminium alkyl and a titanium halide, preferably a trialkyl aluminium such as triethylaluminium in which the alkyl groups have from 1 to 12 carbon atoms each and a titanium chloride. The catalyst system most preferred is a mixture of trialkyl aluminium and a titanium chloride complex.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

Particular organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously and preferably contains an aliphatic or aromatic silane external modifier. Typically, the silane employed as an external modifier in the method of this invention is diisopropyldimethoxysilane, diisobutyldimethoxysilane, di-t-butyl-dimethoxysilane, t-butyltrimethoxysilane, diisopentyldimethoxysilane, di-t-pentyldimethoxysilane, dineopentyldimethoxysilane, neopentyltrimethoxysilane, isobutylisopropyl-dimethoxysilane, isobutyl-t-butyldimethoxysilane, and iso-propyl-t-butyldimethoxysilane and di-p-tolyldimethoxysilane. Preferably, the silane employed as an external modifier is diisopropyldimethoxysilane or diisobutyldimethoxysilane.

The aforesaid silane is present in the catalyst system employed in the method of this invention at a molar ratio of the metal in the cocatalyst to silane in the range of from about 1, preferably from about 3, to about 50, preferably to about 30.

Thus, a typical catalyst system for the polymerization or copolymerization of alpha-olefins is formed by combining the supported titanium-containing catalyst or catalyst component described hereinbelow and an aforesaid alkyl aluminium compound as catalysts, together with the aforesaid silane. Typically, useful aluminium-to-titanium atomic ratios in such catalyst systems are about 10 to about 500 and preferably about 30 to about 400, such as about 50 to about 150. Typical aluminium-to-silane compound molar ratios in such catalyst systems are about 1.5 to about 50, such as about 3 to about 30.

Titanium-containing catalyst components that are especially useful are supported on hydrocarbon-insoluble, magnesium-containing compounds which are optionally in combination with an electron donor compound as an internal modifier. Such supported titanium-containing olefin polymerization catalyst component typically is formed by reacting a titanium (IV) halide, a magnesium-containing compound, and optionally an organic electron donor compound. Optionally, such supported titanium-containing reaction product may be further treated or modified by comminution or further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I-III; magnesium alcoholates; or magnesium alkyls.

The possible solid catalyst components listed above are only illustrative of many possible solid, magnesium-containing, titanium halide-based, hydrocarbon-insoluble catalyst components useful in this invention and known to the art. This invention is not limited to a specific supported catalyst or catalyst component.

Titanium (IV) compounds useful in preparing the solid titanium-containing catalyst component of invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include TiCl4, TiBr4, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

Organic electron donors useful as internal modifiers in preparation of stereospecific supported titanium-containing catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and the like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

Preferred titanium component electron donor compounds as internal modifiers include esters of aromatic acids. Preferred organic electron donors are C1-C6 alkyl esters of aromatic mono- and dicarboxylic acids and halogen-, hydroxyl-, oxo-, alkyl-, alkoxy-, aryl-, and aryloxy-substituted aromatic mono- and dicarboxylic acids. Among these, the alkyl esters of benzoic and halobenzoic acids wherein the alkyl group contains 1 to 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, ethylbutylphthalate, diethylphthalate, and di-n-butylphthalate.

The electron donor component that may be used as internal modifiers in preparation of the solid catalyst component is used in an amount ranging from about 0.001 to about 1.0 mole per gram atom of titanium, and preferably from about 0.005 to about 0.9 mole per gram atom. Best results are achieved when this ratio ranges from about 0.01 to about 0.8 mole per gram atom of titanium.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

What is claimed is:

1. A process for polymerization of a monomer whereby polymer particles are transferred from an upstream polymerization reactor, which process comprises:
   (a) discharging a mixture comprising polymer particles and reactive gases, which reactive gases comprise hydrogen, from the upstream reactor,
   (b) transferring the polymer particles and reactive gases into a first chamber which is in open communication with a second chamber during the transfer such that the polymer particles pass through the first chamber into the second chamber, and wherein
      i) the second chamber is at a pressure which is at least 600 kPa below the operating pressure of the upstream reactor,
      ii) the second chamber has a volume less than or equal to the volume of the first chamber, and
      iii) transfer of polymer particles takes place until there is collected in the second chamber a volume of polymer particles having a settled volume of at least 50% of the volume of the second chamber,
   (c) keeping the first and second chamber in open communication for a time period, t, after completing transfer of the polymer particles to the second chamber, and
   (d) subsequently isolating the second chamber from the first chamber and transferring the polymer particles from the second chamber into a downstream vessel.

2. A process according to claim 1 wherein the upstream polymerization reactor is a quench-cooled, polymerization reactor containing a sub-fluidized particulate bed of polymer or is a gas phase fluidized bed polymerization reactor.

3. A process according to claim 1 wherein the downstream vessel is a downstream polymerization reactor.

4. A process according to claim 3 wherein either:
   i) the upstream and downstream reactors are both quench-cooled, polymerization reactors containing a sub-fluidized particulate bed of polymer,
   ii) the upstream and downstream reactors are both gas phase fluidized bed polymerization reactors, or
   iii) the upstream reactor is a quench-cooled, polymerization reactor containing a sub-fluidized particulate bed of polymer and the downstream reactor is a gas phase fluidized bed reactor.

5. A process according to claim 1 wherein there are provided at least two parallel sets of first chamber and second chamber, and wherein whilst polymer and reactive gases are being transferred according to step (b) in at least one set, steps (c) and (d) can be performed on previously transferred polymer particles in at least one other set.

6. A process according to claim 1 wherein the mixture comprising polymer particles and reactive gases is discharged discontinuously from the upstream reactor.

7. A process according to claim 6 wherein steps (a) and (b) are performed multiple times whilst keeping the first chamber in open communication with the second chamber to collect in the second chamber the volume of polymer solids having a settled volume of at least 50% of the volume of the second chamber.

8. A process according to claim 1 wherein transfer of polymer particles takes place until there is collected in the second chamber a volume of polymer particles having a settled volume of at least 70% of the volume of the second chamber.

9. A process according to claim 1 wherein the pressure in the second chamber after completion of the transfer of polymer particles is in the range 700 kPag to 1500 kPag.

10. A process according to claim 1 wherein the second chamber has a volume less than or equal to 20% of the volume of the first chamber.

11. A process according to claim 1 wherein the time period, t, is sufficient for the polymer particles to degas a volume of absorbed monomer equivalent to the interstitial volume of the polymer particles in the second chamber.

12. A process according to claim 1 wherein the time period, t, is 10 seconds.

13. A process according to claim 1 wherein the transfer in step (d) is due to or assisted by gravity.

14. A process according to claim 1 wherein the transfer in step (d) takes place by pressurising the second chamber to a pressure at least 7 kPa above the pressure of the downstream vessel.

15. The process according to claim 1 wherein the transfer of polymer particles takes place between upstream and downstream high pressure, quench-cooled polymerization reactors each containing a sub-fluidized particulate bed of polymer and wherein the polymer particles are transferred from the second chamber into a downstream reactor via one or more transfer lines which connect the second chamber to one or more inlet ports on the downstream reactor, which one or more inlet ports are located in the reactor wall at an elevation above the free surface of the subfluidized bed of polymer therein.

16. The process according to claim 15 wherein the transfer of polymer particles is carried out using two or more parallel sets of first chamber and second chamber, wherein polymer particles are transferred from each second chamber into the downstream reactor via one or more transfer lines which connect the second chamber to one or more inlet ports on the downstream reactor, and wherein the one or more inlet ports for each set of first chamber and second chamber are orientated longitudinally down the length of the reactor with respect to each other.

17. The process according to claim 16 wherein the second chambers are fabricated with an eccentric cone bottom and mounted back-to-back to facilitate the installation of the inlet ports to the reactor at a minimum distance apart from each other whilst minimizing the length of the transfer lines to the downstream reactor.

18. The process according to claim 1 wherein the reactive gases from the upstream reactor comprise propylene and hydrogen.

19. The process according to claim 1 wherein monomer in the upstream reactor comprises predominantly propylene.

20. The process according to claim 3 wherein the monomer(s) to be polymerized in the downstream reactor comprise propylene, optionally with ethylene or other co-monomers.

* * * * *